United States Patent
Gevorkyan et al.

(10) Patent No.: US 11,409,637 B2
(45) Date of Patent: Aug. 9, 2022

(54) PAGE SIMULATION SYSTEM

(71) Applicant: Netflix, Inc., Los Gatos, CA (US)

(72) Inventors: David Gevorkyan, San Jose, CA (US); Mehmet Yilmaz, Cupertino, CA (US); Ajinkya More, Santa Clara, CA (US); Justin Derrick Basilico, Los Gatos, CA (US); Prasanna Padmanabhan, Los Gatos, CA (US); Vivek Kaushal, Mountain View, CA (US); Gaurav Agrawal, San Jose, CA (US); Richard Wellington, San Jose, CA (US)

(73) Assignee: Netflix, Inc., Los Gatos, CA (US)

(*) Notice: Subject to any disclaimer, the term of this patent is extended or adjusted under 35 U.S.C. 154(b) by 0 days.

(21) Appl. No.: 16/746,795

(22) Filed: Jan. 17, 2020

(65) Prior Publication Data
US 2021/0141712 A1    May 13, 2021

Related U.S. Application Data

(60) Provisional application No. 62/932,279, filed on Nov. 7, 2019.

(51) Int. Cl.
*G06F 11/36* (2006.01)
*G06F 16/22* (2019.01)

(52) U.S. Cl.
CPC ...... *G06F 11/3664* (2013.01); *G06F 11/3608* (2013.01); *G06F 16/22* (2019.01)

(58) Field of Classification Search
CPC ... G06F 11/3664; G06F 11/3608; G06F 16/22
See application file for complete search history.

(56) References Cited

U.S. PATENT DOCUMENTS 10,210,073 B1 * 2/2019 Baruch ............... G06F 16/27
10,977,149 B1 * 4/2021 Zappella ............ G06F 11/3457
(Continued)

OTHER PUBLICATIONS

International Search Report and Written Opinion received for PCT Application Serial No. PCT/US2020/059211 dated Feb. 22, 2021, 13 pages.

(Continued)

*Primary Examiner* — S. Sough
*Assistant Examiner* — Stephen D Berman
(74) *Attorney, Agent, or Firm* — FisherBroyles, LLP

(57) ABSTRACT

The disclosed computer-implemented method may include accessing updated data structures that are to be included in a user interface functionality test, where the updated data structures contribute to a user interface. The method may also include accessing live or snapshotted data captured from services running in a production environment, initiating generation of a first user interface instance using the updated data structures and using the accessed live or snapshotted data, and initiating generation of a second user interface instance using a different version of the data structures and using the same accessed live or snapshotted data. The method further includes comparing the first user interface instance to the second user interface instance to identify differences and then determine which outcome-defining effects the updated data structures had on the user interface based on the identified differences between the user interfaces. Various other methods, systems, and computer-readable media are also disclosed.

20 Claims, 6 Drawing Sheets

(56) References Cited

U.S. PATENT DOCUMENTS

| | | | |
|---|---|---|---|
| 2006/0162071 A1* | 7/2006 | Dixon | G06Q 30/02 |
| | | | 5/93.1 |
| 2014/0040669 A1* | 2/2014 | Davis | G06F 11/3636 |
| | | | 714/37 |
| 2016/0147509 A1* | 5/2016 | Chan | G06F 11/368 |
| | | | 717/106 |
| 2017/0124487 A1 | 5/2017 | Szeto et al. | |
| 2018/0024916 A1* | 1/2018 | Shazly | G06F 11/3696 |
| | | | 717/124 |
| 2020/0044760 A1* | 2/2020 | Seed | H04W 4/70 |
| 2020/0111018 A1* | 4/2020 | Golovin | G06N 7/005 |
| 2020/0349172 A1* | 11/2020 | Constandache | G06F 16/275 |
| 2020/0394122 A1* | 12/2020 | Burde | G06F 11/3636 |

OTHER PUBLICATIONS

Grechanik et al., "Differencing Graphical User Interfaces", International Conference on Software Quality, Reliability and Security, IEEE, Jul. 16, 2018, pp. 203-214.

* cited by examiner

PAGE SIMULATION SYSTEM

CROSS REFERENCE TO RELATED APPLICATION

This application claims the benefit of U.S. Provisional Application No. 62/932,279, filed Nov. 7, 2019, the disclosure of which is incorporated, in its entirety, by this reference.

BACKGROUND

Users typically interact with software applications via a user interface (UI). The user interface may be generated based on static code, where the UI is the same each time, or the UI may be generated based on dynamic code that changes each time. For instance, some user interfaces may be generated based on data from a variety of different sources. These sources may specify a user's profile information, past selections, past purchases, browsing tendencies, or other data. This data may be used by machine learning models or other services to generate rows, columns, graphics, UI elements, and other portions of the user interface. As such, some user interfaces may be based on a complex set of underlying data and algorithms.

Traditionally, if a user interface developer in such an instance wanted to change or add a new aspect to the user interface, that developer would set up an A/B test to test the new features. The A/B test would include an A group that tested the new user interface with the new features, while the B group would continue using the old user interface lacking the new features. At the end of the A/B test, the developer would have the data they needed to determine whether the new features were successful or not in providing the desired functionality. Setting up these A/B tests, however, can take a very long time. In some cases, setting up a proper A/B test to monitor and test such UI code may take many weeks or months to implement. Moreover, the A/B test may interfere with currently running production systems which may lead to users being served with improper or untested user interfaces.

SUMMARY

As will be described in greater detail below, the present disclosure describes systems and methods for simulating user interfaces and other underlying software code without having to perform lengthy A/B tests. In one example, a computer-implemented method for simulating a user interface includes accessing, by a controller, various updated data structures that are to be included in a user interface functionality test. The updated data structures, which may include software code, machine learning models, configuration files, etc., may contribute at least partially to a user interface that is to be generated. The method may further include accessing, by the controller, a portion of live or snapshotted data captured from various services running in a production environment. The live or snapshotted data may be used in the user interface functionality test.

Still further, the method may include initiating, by the controller, generation of a first user interface instance using the updated data structures and using the accessed live or snapshotted data. The method may also include initiating, by the controller, generation of a second user interface instance using a different version of the data structures and using the same accessed live or snapshotted data. The first and second user interface instances may be generated within the production environment but may be inaccessible to external users. The method may further include comparing, by the controller, the first user interface instance to the second user interface instance to identify differences between the first user interface instance and the second user interface instance and then, based on the comparison, determine, by the controller, outcome-defining effects the updated data structures had on the user interface based on the identified differences between the first user interface instance and the second user interface instance.

In some examples, the controller further coordinates the services to access the live or snapshotted data starting at a specified point in time. In some examples, the controller further coordinates the services to access a common clock based on the specified point in time.

In some examples, the controller establishes a contract between the services to ensure that the services use the same version of metadata and to ensure that the services access the same live or snapshotted data. In some examples, the snapshotted data may include inputs received at the services in addition to outputs generated by the services. In some examples, the services comprise stateful services running in the production environment, where at least a portion of state information being stored for each service.

In some examples, the updated data structures include software code, configuration files, or machine learning models. In some examples, the controller modifies the services, such that calls for data between services are routed to the modified versions of the services.

In some examples, the modified versions of the services may be instantiated to process a batch of tasks and may be automatically shut down upon completion of the batch of tasks. In some examples, the modified versions of the services may be instantiated to process the batch of tasks may be assigned a specified data snapshot to use when processing the batch of tasks. In some examples, the controller may switch from live data to snapshotted data or may switch from snapshotted data to live data upon receiving an indication to make a switch.

In addition, a corresponding system for simulating user interfaces may include at least one physical processor, and physical memory comprising computer-executable instructions that, when executed by the physical processor, cause the physical processor to: access, by a controller, various updated data structures that are to be included in a user interface functionality test, where the updated data structures contribute at least partially to a user interface. The physical processor further accesses, by the controller, a portion of live or snapshotted data captured from various services running in a production environment. The live or snapshotted data may be used in the user interface functionality test.

The physical processor may further, initiate, by the controller, generation of a first user interface instance using the updated data structures and using the accessed live or snapshotted data, and may initiate, by the controller, generation of a second user interface instance using a different version of the data structures and using the same accessed live or snapshotted data. The first and second user interface instances may be generated within the production environment but may be inaccessible to external users. The physical processor may also, compare, by the controller, the first user interface instance to the second user interface instance to identify differences between the first user interface instance and the second user interface instance, and based on the comparison, determine, by the controller, outcome-defining effects the updated data structures had on the user interface based on the identified differences between the first user interface instance and the second user interface instance.

In some examples, the system further computes metrics to establish a quality level of simulated behavior indicated by the outcome-defining effects. In some examples, computing the metrics may include altering user interface objects shown in the user interface to remove bias in the one or more outcome-defining effects. In some examples, the metrics give at least partial credit for similarities in outcome-defining effects identified in the comparison between the first user interface instance and the second user interface instance.

In some examples, comparing the first user interface instance to the second user interface instance may include comparing at least one of the first user interface instance or the second user interface instance to previous A/B test results. In some examples, the comparison to the previous A/B tests indicates whether a new A/B test is to be run. In some examples, the second user interface instance is generated using snapshotted data that indicates user inputs over a specified period of time relative to a version of the user interface that was presented to the user at the time the snapshot was taken.

In some examples, comparing the first user interface instance to the second user interface instance to identify one or more differences between the first user interface instance and the second user interface instance may include comparing the first user interface instance generated using the updated data structures to the second user interface instance generated using the snapshotted data with the indicated user inputs over the specified period of time, such that the comparison indicates how the first user interface instance with the one or more updated data structures compares to the second user interface instance using the same snapshotted user inputs.

In some examples, the above-described method may be encoded as computer-readable instructions on a computer-readable medium. For example, a computer-readable medium may include one or more computer-executable instructions that, when executed by at least one processor of a computing device, may cause the computing device to access, by a controller, updated data structures that are to be included in a user interface functionality test, where the updated data structures contribute at least partially to a user interface. The instructions also cause the processor to access, by the controller, a portion of live or snapshotted data captured from services running in a production environment, wherein the live or snapshotted data is used in the user interface functionality test.

The instructions also cause the processor to initiate, by the controller, generation of a first user interface instance using the updated data structures and using the accessed live or snapshotted data and to initiate, by the controller, generation of a second user interface instance using a different version of the data structures and using the same accessed live or snapshotted data, where the first and second user interface instances are generated within the production environment but are inaccessible to external users. The instructions further cause the processor to compare, by the controller, the first user interface instance to the second user interface instance to identify one or more differences between the first user interface instance and the second user interface instance, and based on the comparison, determine, by the controller, outcome-defining effects the updated data structures had on the user interface based on the identified differences between the first user interface instance and the second user interface instance.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
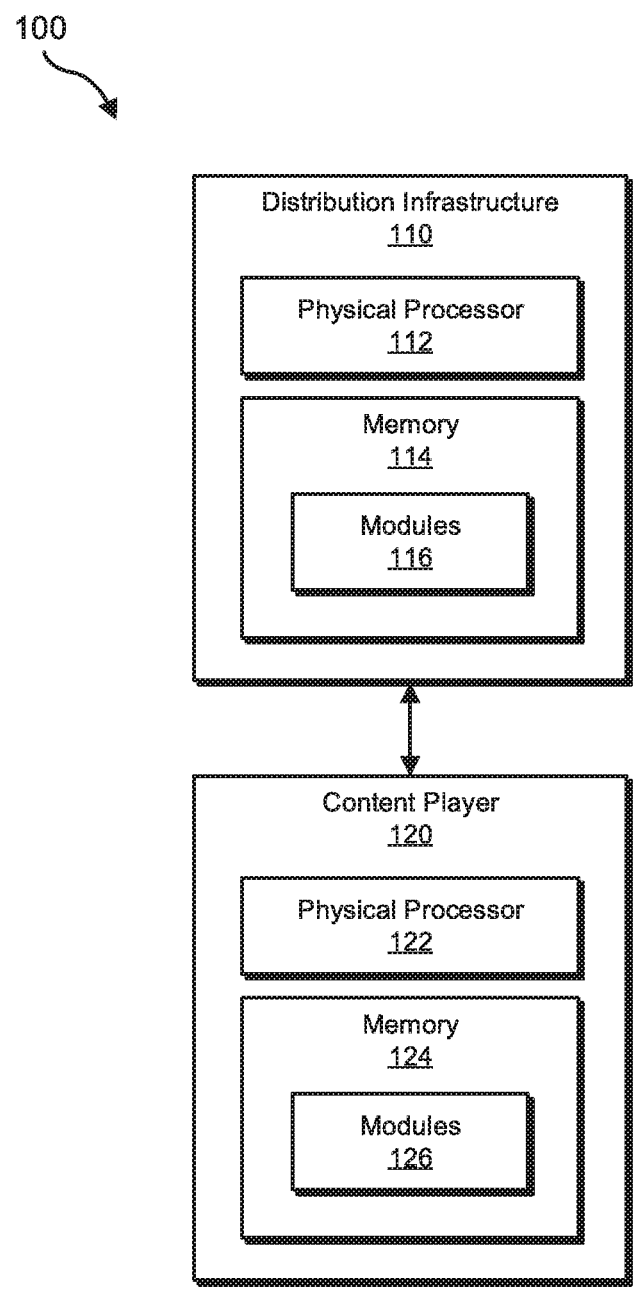
FIG. 1 is a block diagram of an exemplary content distribution ecosystem.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to simulating user interfaces in a production environment. As will be explained in greater detail below, embodiments of the present disclosure may be directed to methods and systems for simulating user interface home pages so that time- and resource-consuming A/B tests may be avoided. In traditional development environments, if a developer wanted to tweak and test an aspect of a software application, that developer would need to run an A/B test on the new features. For instance, if a developer of a user interface wanted to change one or more aspects of that user interface, the developer would make the changes and then set up an A/B test where the "A" code had the updated features, while the "B" code being tested did not have the new features. As users used and interacted with the new user interface, the developer would be able to see how the "A" code performed relative to the "B" code.

In some embodiments herein, a developer or other user may be developing or otherwise providing a user interface home page. This user interface homepage may display different user interface elements to each user based on a complex series of recommendations from different types of services, different machine learning models, and other data sources. Setting up an A/B test to monitor the results of changes to such a user interface may take many weeks or months, as the complexity of the system may necessitate many controls and configurations to monitor each of the services, each of the machine learning models, etc. Accordingly, in such cases, applying new changes to the underlying user interface code may be prohibitively expensive to implement, either in time or in cost. As such, at least in some cases, the underlying code may go for long periods of time without an update, and may lack features that are desired by users. Moreover, security updates that need to be implemented may be delayed due to the long A/B test cycle to ensure that the security fixes do not degrade performance or the overall user experience.

In contrast, the embodiments described herein may allow developers to create a simulated UI home page running on development code and determine whether the simulated UI displayed the expected functionality. The simulation may involve real user data and may simulate what each user would have seen had the simulated user interface actually been exposed to the public (or exposed to its subscribed users). In some cases, the embodiments described herein may involve coordinating multiple disparate services that each apply different types of logic and algorithms to create the user interface.

For example, one of these services may include a layout service that determines a layout for elements in the user interface. Another service may include a recommendation service that determines which items are to be shown in the user interface in the selected layout. Another service may include an ordering service that determines the order in which the recommended items are shown in the user interface. Many other types of services may provide input into what is ultimately presented in the user interface. In some cases, the embodiments described herein may provide, as a data feed, live or snapshot data to each of these disparate services. This live and snapshot data may be used to produce a simulation that accurately portrays how the updates to the UI would function on a production server. Although the services operate using actual client and service data and although the simulations may be generated directly on production systems, none of the simulation data may be stored on production caches. This maintains a separation between production data and simulation data. In this manner, developers can quickly and reliably test changes to a user interface (or other complex software code) on production systems without having worry about whether end users will see the test results.

Figure 2:
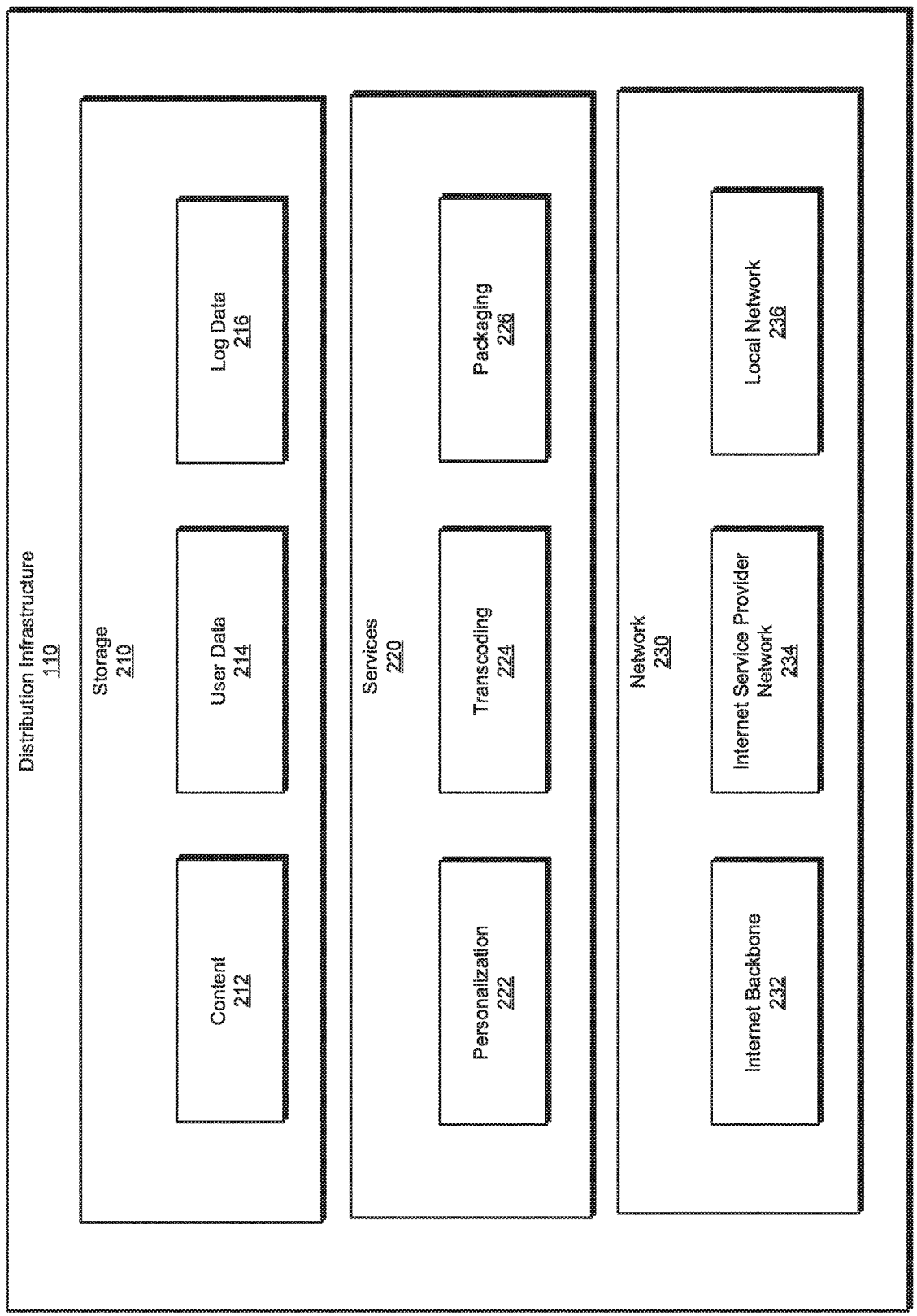
FIG. 2 is a block diagram of an exemplary distribution infrastructure within the content distribution ecosystem shown in FIG. 1.
Figure 3:
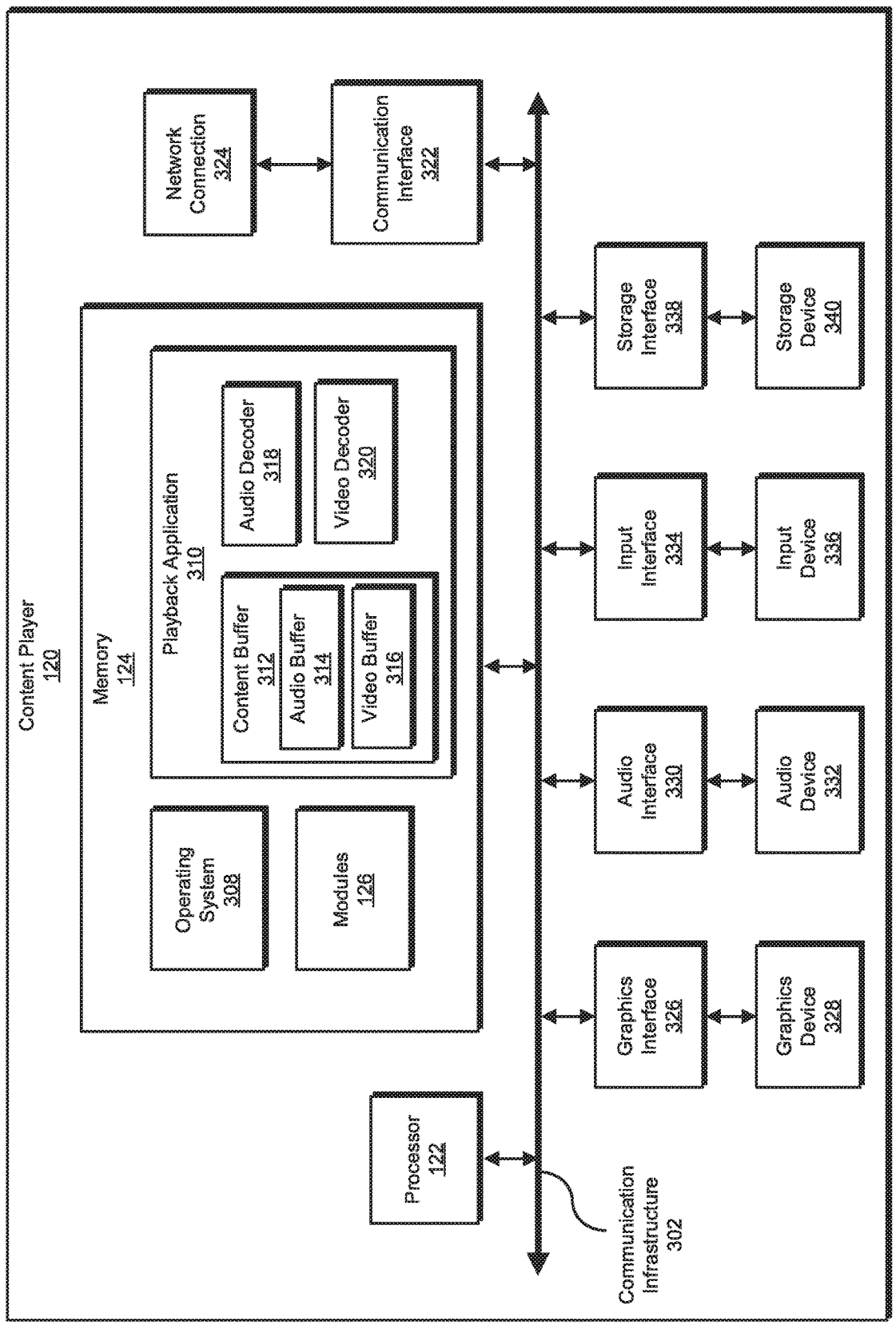
FIG. 3 is a block diagram of an exemplary content player within the content distribution ecosystem shown in FIG. 1.

The following will provide, with reference to FIG. 1, detailed descriptions of exemplary ecosystems in which content is provisioned to end nodes and in which requests for content are steered to specific end nodes. The discussion corresponding to FIGS. 2 and 3 presents an overview of an exemplary distribution infrastructure and an exemplary content player used during playback sessions, respectively. Detailed descriptions of corresponding computer-implemented methods for adaptive streaming of multimedia content will be provided in connection with FIG. 4.

FIG. 1 is a block diagram of a content distribution ecosystem 100 that includes a distribution infrastructure 110 in communication with a content player 120. In some embodiments, distribution infrastructure 110 is configured to encode data at a specific data rate and to transfer the encoded data to content player 120. Content player 120 is configured to receive the encoded data via distribution infrastructure 110 and to decode the data for playback to a user. The data provided by distribution infrastructure 110 includes, for example, audio, video, text, images, animations, interactive content, haptic data, virtual or augmented reality data, location data, gaming data, or any other type of data that is provided via streaming.

Distribution infrastructure 110 generally represents any services, hardware, software, or other infrastructure components configured to deliver content to end users. For example, distribution infrastructure 110 includes content aggregation systems, media transcoding and packaging services, network components, and/or a variety of other types of hardware and software. In some cases, distribution infrastructure 110 is implemented as a highly complex distribution system, a single media server or device, or anything in between. In some examples, regardless of size or complexity, distribution infrastructure 110 includes at least one physical processor 112 and at least one memory device 114. One or more modules 116 are stored or loaded into memory 114 to enable adaptive streaming, as discussed herein.

Content player 120 generally represents any type or form of device or system capable of playing audio and/or video content that has been provided over distribution infrastructure 110. Examples of content player 120 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 110, content player 120 includes a physical processor 122, memory 124, and one or more modules 126. Some or all of the adaptive streaming processes described herein is performed or enabled by modules 126, and in some examples, modules 116 of distribution infrastructure 110 coordinate with modules 126 of content player 120 to provide adaptive streaming of multimedia content.

In certain embodiments, one or more of modules 116 and/or 126 in FIG. 1 represent one or more software applications or programs that, when executed by a computing device, cause the computing device to perform one or more tasks. For example, and as will be described in greater detail below, one or more of modules 116 and 126 represent modules stored and configured to run on one or more general-purpose computing devices. One or more of modules 116 and 126 in FIG. 1 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 112 and 122 generally represent any type or form of hardware-implemented processing unit capable of interpreting and/or executing computer-readable instructions. In one example, physical processors 112 and 122 access and/or modify one or more of modules 116 and 126, respectively. Additionally or alternatively, physical processors 112 and 122 execute one or more of modules 116 and 126 to facilitate adaptive streaming of multimedia content. Examples of physical processors 112 and 122 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 114 and 124 generally represent any type or form of volatile or non-volatile storage device or medium capable of storing data and/or computer-readable instructions. In one example, memory 114 and/or 124 stores, loads, and/or maintains one or more of modules 116 and 126. Examples of memory 114 and/or 124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 2 is a block diagram of exemplary components of content distribution infrastructure 110 according to certain embodiments. Distribution infrastructure 110 includes storage 210, services 220, and a network 230. Storage 210 generally represents any device, set of devices, and/or systems capable of storing content for delivery to end users. Storage 210 includes a central repository with devices capable of storing terabytes or petabytes of data and/or includes distributed storage systems (e.g., appliances that mirror or cache content at Internet interconnect locations to provide faster access to the mirrored content within certain regions). Storage 210 is also configured in any other suitable manner.

As shown, storage 210 may store a variety of different items including content 212, user data 214, and/or log data 216. Content 212 includes television shows, movies, video games, user-generated content, and/or any other suitable type or form of content. User data 214 includes personally identifiable information (PII), payment information, preference settings, language and accessibility settings, and/or any other information associated with a particular user or content player. Log data 216 includes viewing history information, network throughput information, and/or any other metrics associated with a user's connection to or interactions with distribution infrastructure 110.

Services 220 includes personalization services 222, transcoding services 224, and/or packaging services 226. Personalization services 222 personalize recommendations, content streams, and/or other aspects of a user's experience with distribution infrastructure 110. Encoding services 224 compress media at different bitrates which, as described in greater detail below, enable real-time switching between different encodings. Packaging services 226 package encoded video before deploying it to a delivery network, such as network 230, for streaming.

Network 230 generally represents any medium or architecture capable of facilitating communication or data transfer. Network 230 facilitates communication or data transfer using wireless and/or wired connections. Examples of network 230 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 2, network 230 includes an Internet backbone 232, an internet service provider 234, and/or a local network 236. As discussed in greater detail below, bandwidth limitations and bottlenecks within one or more of these network segments triggers video and/or audio bit rate adjustments.

FIG. 3 is a block diagram of an exemplary implementation of content player 120 of FIG. 1. Content player 120 generally represents any type or form of computing device capable of reading computer-executable instructions. Content player 120 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 3, in addition to processor 122 and memory 124, content player 120 includes a communication infrastructure 302 and a communication interface 322 coupled to a network connection 324. Content player 120 also includes a graphics interface 326 coupled to a graphics device 328, an input interface 334 coupled to an input device 336, and a storage interface 338 coupled to a storage device 340.

Communication infrastructure 302 generally represents any type or form of infrastructure capable of facilitating communication between one or more components of a computing device. Examples of communication infrastructure 302 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 124 generally represents any type or form of volatile or non-volatile storage device or medium capable of storing data and/or other computer-readable instructions. In some examples, memory 124 stores and/or loads an operating system 308 for execution by processor 122. In one example, operating system 308 includes and/or represents software that manages computer hardware and software resources and/or provides common services to computer programs and/or applications on content player 120.

Operating system 308 performs various system management functions, such as managing hardware components (e.g., graphics interface 326, audio interface 330, input interface 334, and/or storage interface 338). Operating system 308 also provides process and memory management models for playback application 310. The modules of playback application 310 includes, for example, a content buffer 312, an audio decoder 318, and a video decoder 320.

Playback application 310 is configured to retrieve digital content via communication interface 322 and play the digital content through graphics interface 326. Graphics interface 326 is configured to transmit a rendered video signal to graphics device 328. In normal operation, playback application 310 receives a request from a user to play a specific title or specific content. Playback application 310 then identifies one or more encoded video and audio streams associated with the requested title. After playback application 310 has located the encoded streams associated with the requested title, playback application 310 downloads sequence header indices associated with each encoded stream associated with the requested title from distribution infrastructure 110. A sequence header index associated with encoded content includes information related to the encoded sequence of data included in the encoded content.

In one embodiment, playback application 310 begins downloading the content associated with the requested title by downloading sequence data encoded to the lowest audio and/or video playback bit rates to minimize startup time for playback. The requested digital content file is then downloaded into content buffer 312, which is configured to serve as a first-in, first-out queue. In one embodiment, each unit of downloaded data includes a unit of video data or a unit of audio data. As units of video data associated with the requested digital content file are downloaded to the content player 120, the units of video data are pushed into the content buffer 312. Similarly, as units of audio data associated with the requested digital content file are downloaded to the content player 120, the units of audio data are pushed into the content buffer 312. In one embodiment, the units of video data are stored in video buffer 316 within content buffer 312 and the units of audio data are stored in audio buffer 314 of content buffer 312.

A video decoder 320 reads units of video data from video buffer 316 and outputs the units of video data in a sequence of video frames corresponding in duration to the fixed span of playback time. Reading a unit of video data from video buffer 316 effectively de-queues the unit of video data from video buffer 316. The sequence of video frames is then rendered by graphics interface 326 and transmitted to graphics device 328 to be displayed to a user.

An audio decoder 318 reads units of audio data from audio buffer 314 and output the units of audio data as a sequence of audio samples, generally synchronized in time with a sequence of decoded video frames. In one embodiment, the sequence of audio samples are transmitted to audio interface 330, which converts the sequence of audio samples into an electrical audio signal. The electrical audio signal is then transmitted to a speaker of audio device 332, which, in response, generates an acoustic output.

In situations where the bandwidth of distribution infrastructure 110 is limited and/or variable, playback application 310 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 326 is configured to generate frames of video data and transmit the frames of video data to graphics device 328. In one embodiment, graphics interface 326 is included as part of an integrated circuit, along with processor 122. Alternatively, graphics interface 326 is configured as a hardware accelerator that is distinct from (i.e., is not integrated within) a chipset that includes processor 122.

Graphics interface 326 generally represents any type or form of device configured to forward images for display on graphics device 328. For example, graphics device 328 is fabricated using liquid crystal display (LCD) technology, cathode-ray technology, and light-emitting diode (LED) display technology (either organic or inorganic). In some embodiments, graphics device 328 also includes a virtual reality display and/or an augmented reality display. Graphics device 328 includes any technically feasible means for generating an image for display. In other words, graphics device 328 generally represents any type or form of device capable of visually displaying information forwarded by graphics interface 326.

As illustrated in FIG. 3, content player 120 also includes at least one input device 336 coupled to communication infrastructure 302 via input interface 334. Input device 336 generally represents any type or form of computing device capable of providing input, either computer or human generated, to content player 120. Examples of input device 336 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 120 also includes a storage device 340 coupled to communication infrastructure 302 via a storage interface 338. Storage device 340 generally represents any type or form of storage device or medium capable of storing data and/or other computer-readable instructions. For example, storage device 340 may be a magnetic disk drive, a solid-state drive, an optical disk drive, a flash drive, or the like. Storage interface 338 generally represents any type or form of interface or device for transferring data between storage device 340 and other components of content player 120.

Many other devices or subsystems are included in or connected to content player 120. Conversely, one or more of the components and devices illustrated in FIG. 3 need not be present to practice the embodiments described and/or illustrated herein. The devices and subsystems referenced above are also interconnected in different ways from that shown in FIG. 3. Content player 120 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into content player 120. All or a portion of the computer program stored on the computer-readable medium is then stored in memory 124 and/or storage device 340. When executed by processor 122, a computer program loaded into memory 124 causes processor 122 to perform and/or be a means for performing the functions of one or more of the example embodiments described and/or illustrated herein. Additionally or alternatively, one or more of the example embodiments described and/or illustrated herein are implemented in firmware and/or hardware. For example, content player 120 is configured as an Application Specific Integrated Circuit (ASIC) adapted to implement one or more of the example embodiments disclosed herein.

Figure 4:
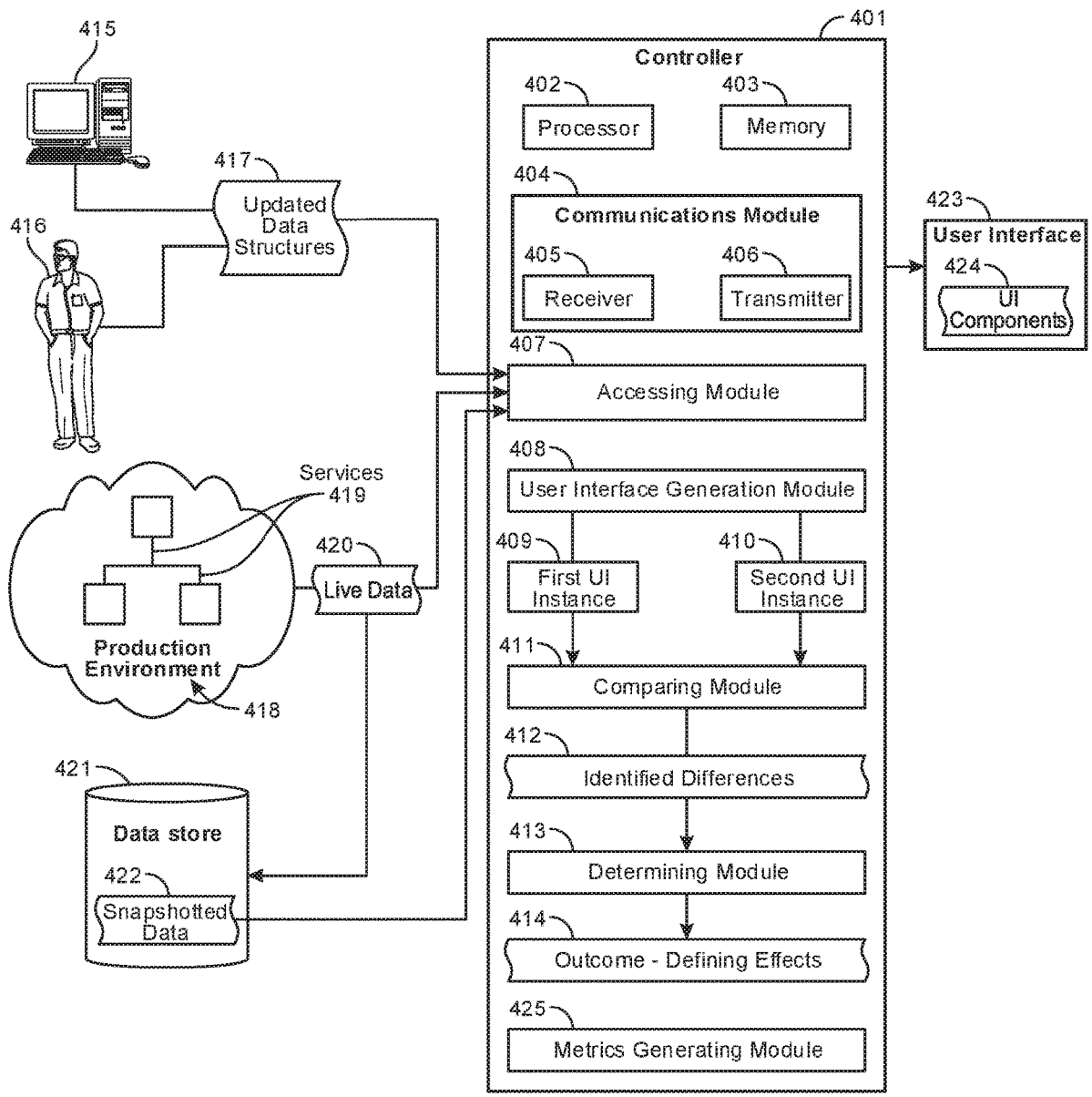
FIG. 4 illustrates a computing architecture in which user interfaces may be simulated within a production system.

FIG. 4 illustrates a computing environment 400 that includes a controller 401. The controller 401 may be a software module, an embedded hardware component such as a processor, or a computer system. In cases where the controller 401 is a computer system, the computer system may be substantially any type of computing system including a local computing system or a distributed (e.g., cloud) computing system. In some cases, the controller 401 may include at least one processor 402 and at least some system memory 403. The controller 401 may include program modules for performing a variety of different functions. The program modules may be hardware-based, software-based, or may include a combination of hardware and software. Each program module uses computing hardware and/or software to perform specified functions, including those described herein below.

The controller 401 may also include a communications module 404 that is configured to communicate with other computer systems. The communications module 404 includes any wired or wireless communication means that can receive and/or transmit data to or from other computer systems. These communication means include hardware interfaces including Ethernet adapters, WIFI adapters, hardware radios including, for example, a hardware-based receiver 405, a hardware-based transmitter 406, or a combined hardware-based transceiver capable of both receiving and transmitting data. The radios are cellular radios, Bluetooth radios, global positioning system (GPS) radios, or other types of radios. The communications module 404 is configured to interact with databases, mobile computing devices (such as mobile phones or tablets), embedded or other types of computing systems.

The controller 401 also includes an accessing module 407. The accessing module 407 may be configured to access updated data structures 417. The updated data structures 417 may be accessed from another computer system (e.g., 415), from a client device used by a user (e.g., 416), from a data store (e.g., 421), or from some other source. The updated data structures 417 may include software code or software modules, machine learning models, application programming interfaces (APIs), configuration files, user profile data, or any other type of data or software code that may be used as part of a user interface or may be used in generating a user interface or performing some other software function. The updated data structures 417 may include new data or changes to old data that are to be applied to the user interface 423. The updated data structures 417 may include new UI components 424, or may include changes to how the UI components are arranged, or may include changes to which UI components are shown on a given user interface. In the embodiments herein, the UI 423 may include substantially any number of potential components which may be arranged or ordered and displayed in substantially any configuration. Some of these UI components 424 may include text or graphics that are generated on the fly. Each UI 423 may be specific to a given user and may be based on that user's preferences, past selections, or other data that would personalize the UI to that user.

Many different services 419 may be implemented when determining which UI components 424 to show and when determining how those components are shown in UI 423. As noted above, the services 419 may include services that determine which movies or tv shows, for example, to show in a given row or column, or may include services that determine which order various rows of tv or movie display cards are shown to a user, or may include services that fetch and surface data indicating which tv shows or movies the user has watched in the past or which shows the user may be interested in viewing in the future. Any or all of these services may implement one or more machine learning models to more accurately tailor recommendations to a user in the way and the order they would most likely want to see. As can be seen, the services and data accessed to generate any one given instance of user interface 423 may be very large.

These services 419 may run in a production environment 418. This production environment 418 may be local or distributed, and may include a single server to many thousands of servers or more, distributed all over the world. The production environment 418 may have access to live data 420 including user interface interactions coming in from users all over the world. This live data 420 may also be accessed by the accessing module 407. Additionally or alternatively, the accessing module 407 may access snapshotted data 422. This snapshotted data 422 may include user interaction data along with state data representing a point in time or a given time window (e.g., six hours). The snapshotted data 422 may include not only indications of which items the user selected within the UI 423, but may also include state data showing which items were presented to the user, which items the user had chosen in the past, which items were trending on that day, etc. Thus, the snapshotted data 422 may represent a "whole picture" view of a given user interface instance, recording not just what was show to the user and how the user responded, but also why given items were shown in the user interface.

Thus, the accessing module 407 may access different types of data from a variety of different sources. The user interface generation module 408 of controller 401 may be configured to generate different user interface instances (e.g., 409 and 410). Each user interface instance may be a single instantiation of UI 423, tailored to a given user or other entity. The UI instance may draw on the same services used for other UI instances, but may be unique in that it is built on different data (e.g., data that is specific to a given user). Thus, each UI instance may be unique. In some cases, when simulating functionality, the same user data and the same input data is used in both the first UI instance 409 and the second UI instance 410. For example, the first UI instance 409 may be generated by module 408 using updated data structures 417, while UI instance 410 is generated using older or current (non-updated) data structures. Because both UI instances are generated using the same user data (e.g., the live or snapshotted data received from the services 419), the UI developer may be able to see the differences in how each of the UI instances 409/410 is generated. In at least some cases, the first and second UI instances may be accessible to the developer, but may be inaccessible to users that are external to the developer or the developer's organization. Thus, the simulations may be performed on a production environment, while avoiding presenting any of the test UI instances to the public.

The comparing module 411 may access the generated UI instances 409/410 and may analyze the UI instances to identify differences 412. These differences may include changes in UI components 424 used, UI component placement, inclusion (or exclusion) of certain UI elements (such as tv show or movie display cards), or other differences 412. The determining module 413 may then determine one or more outcome-defining effects 414 for the test. These outcome-defining effects 414 may indicate, for example, that the updated data structures 417 impacted the UI 423 in a positive way or in a negative way. The outcome-defining effects 414 may indicate which specific changes were valuable and which were not. Thus, the outcome-defining effects 414 may indicate to the developer whether the updated data structures 417 were successful in their intended purpose or whether they were unsuccessful. As will be explained further below, a metrics generating module 425 may be configured to generate metrics indicating why a given change was successful or not.

Figure 5:
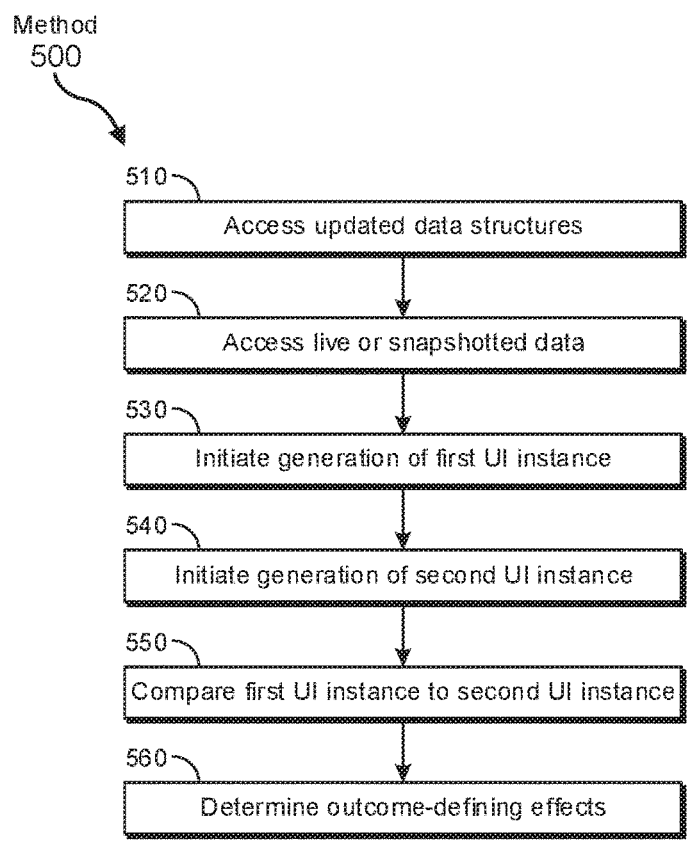
FIG. 5 is a flow diagram of an exemplary method for simulating a user interface within a production system.

FIG. 5 is a flow diagram of an exemplary computer-implemented method 500 for simulating a user interface within a production system. The steps shown in FIG. 5 may be performed by any suitable computer-executable code and/or computing system, including the system 400 illustrated in FIG. 4. In one example, each of the steps shown in FIG. 5 may represent an algorithm whose structure includes and/or is represented by multiple sub-steps, examples of which will be provided in greater detail below.

As illustrated in FIG. 5, at step 510, the accessing module 407 of controller 401 may access one or more updated data structures 417 that are to be included in a user interface functionality test. The updated data structures 417 contribute at least partially to a user interface 423. The method 500 may further include, at step 520, accessing a portion of live 420 or snapshotted data 422 captured from one or more services 419 running in a production environment 418. The live 420 or snapshotted data 422 may be used in the user interface functionality test. Method 500 may further include initiating, by the controller 401, generation of a first user interface instance 409 using the updated data structures 417 and using the accessed live 420 or snapshotted data 422 (at step 530) and initiating generation of a second user interface instance 410 using a different version of the data structures and using the same accessed live 420 or snapshotted data 422 (at step 540). These first and second user interface instances may be generated within the production environment 418 but may be inaccessible to external users.

The method 500 may further include, comparing, by the controller, the first user interface instance to the second user interface instance to identify one or more differences between the first user interface instance and the second user interface instance (at step 550) and, based on the comparison, determining, by the controller, one or more outcome-defining effects the updated data structures had on the user interface based on the identified differences between the first user interface instance and the second user interface instance (at step 560). These steps will be described further below with regard to the computing environments 400 and 600 of FIGS. 4 and 6, respectively.

Figure 6:
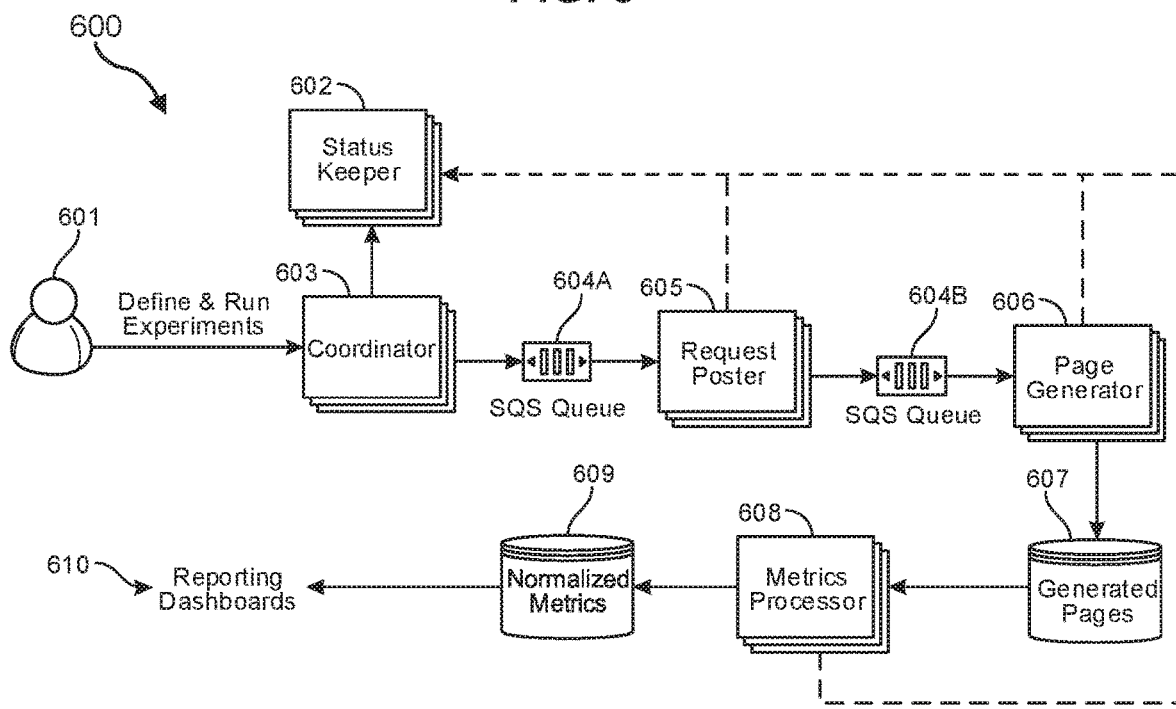
FIG. 6 illustrates an alternative computing architecture in which user interfaces may be simulated within a production system.

FIG. 6 illustrates a computing environment 600 in which various embodiments may be carried out. For example, a user 601 may wish to define and run one or more experiments. These experiments may be performed in order to improve a piece of software code such as code that creates an interactive user interface. In some examples, these experiments may be performed in order to improve a user interface, such as a user interface that presents movies or tv shows for streaming to an electronic device. The UI may be designed to show personalized content to a user. As such, at least some embodiments may implement a recommendation system that uses many different machine learning algorithms to create personalized movie and tv show recommendations that are presented on the user interface. Additional UI features may include logic that handles constraints such as maturity filtering and deduplication.

Any or all of these algorithms and logic may be used together in a UI generation system (e.g., 600 of FIG. 6) to produce each personalized UI homepage. As noted above, while a diverse set of algorithms working together can produce a very personalized and highly efficient UI, innovating on such a complex system can be difficult. For instance, adding a single feature to one of the recommendation algorithms may change how the whole personalized UI homepage is put together. Or, conversely, a big change to such a ranking system may only have a small incremental impact, for instance because it makes the ranking of a row similar to that of another existing row.

Moreover, when systems such as the UI generation system 600 implement components driven by machine learning, the system may also measure the overall outcome of a change in the model to a change in the overall system, and not just the local impact for the model itself. In the embodiments herein, various offline metrics may be used to measure the performance of machine learning (ML) model changes on historical data. By implementing offline metrics, the system may ascertain a reasonable idea of how well an ML model change would perform online (i.e., in production). The embodiments herein may allow changes in any of the models or logic involved to be tested on the production servers, but in a manner that separates the simulated tests from the real-life production data.

To address this, the system 600 may be designed to simulate what a user's homepage would have looked like with a specific code change or model change, and compare it against the page a user actually saw in the service to get an indication of the overall quality of the change. While the system primarily uses this for evaluating modifications to machine learning algorithms, such as what happens when the system has a new row selection or ranking algorithm, the system can also use the simulation to evaluate any changes in the code used to construct the page, from filtering rules to new types of rows for displaying selectable items (e.g., UI components 424 of UI 423 in FIG. 4). This type of simulation allows the system to try out many more new ideas and evaluate them without needing to expose users to them first.

In some cases, the system 600 may be configured to perform tests using past data (e.g., snapshotted data 422). The snapshotted data allows the system to reconstruct a view of the data for a UI page at certain points in the past. As such, the system may implement "time-travel mechanisms" that track all of the session state and inputs that led to certain UI presentations. These time travel mechanisms may be implemented to provide precise reconstruction of an experience that extends beyond features to run an entire system and to coordinate time-travel across multiple services or systems.

When a user builds a simulation system (e.g., 600), that system may be run using a large number of samples to generate reliable results. In some case, this may mean generating millions of UI pages ranking movies and tv shows. Simulating such numbers of UI instances may lead to problems of scale for the simulation system. For instance, the system may need to ensure that the executions run within a reasonable time frame, or may need to coordinate work despite the distributed nature of the system, or may need to ensure that the simulation system is easy to use and easy to extend for future types of experiments. In short, the simulation system may strive to work at scale while also being fast, reliable, and easy to use.

Thus, as noted above, the user 601 may provide an experiment scope that defines what user profile characteristics the simulation system is to simulate UI pages for. The experiment scope may specify something relatively simple such as a random sample of all active profiles. Or, the experiment scope may specify that the UI tests are to focus on generating UI pages for a specific type of device (e.g. iPads). Thus, the user may attempt to tailor the scope to the metrics the experiment aims to calculate. This may involve defining three aspects: 1) a data source, 2) stratification rules for profile selection, and 3) a number of profiles for the experiment.

Regarding a data source, the user 601 may one or a combination of two different mechanisms for data retrieval: data retrieval via time travel and data retrieval via live service calls. In the time travel approach, the system 600 uses snapshotted data to compute the UI page as the UI page (607) would have been generated at some point in the past. In the experimentation landscape, time traveled (e.g., snapshotted) data provides the ability to compute metrics that allow the system to back-test the performance of any page generation model with a high level of accuracy. In particular, using snapshotted data allows the system 600 to compare a new UI page against a UI page that a user (e.g., a system subscriber or system member) had seen and interacted with in the past, including which actions they took in the section relative to the UI page.

The second approach to data retrieval uses a live data retrieval mechanism that, at least in some cases, may be the same as that used in a live production system (e.g., 418). This live data retrieval mechanism may call live microservices that have the most recent production data. To simulate production systems very closely, in this mode, the system 600 typically selects profiles that have recently used their device to log into the production system. When using live data, the system may only be able to compute a limited set of metrics compared to time-travel mode due to having an incomplete set of data. However, these kinds of live data experiments may still illustrate various advantages and disadvantages to an updated data structure (e.g., 417 of FIG. 4). For example, live data experiments may allow the experimenter to perform final checks before the system allocates a new A/B test, or may roll out and experiment on a new feature to look for bugs or unexpected problems before exposing live traffic to it. Live data experiments may also allow the system to analyze changes in UI page composition, which are measures of the rows and videos on the page, to validate that the changes the experimenter is making are having the intended effect without unexpected side-effects. The live data experiments may also aid in determining whether two different approaches are producing UI pages that are similar enough that the experimenter 601 may not need to test both approaches. Still further, the live data experiments may allow early detection of any negative interactions between two features that are assigned to be rolled out simultaneously.

Once the data source is specified, a combination of different stratification types may be applied to refine the user's test data selections. Some examples of stratification types are: country (where the system selects profiles based on their country), tenure (where the system selects profiles based on their membership tenure), long-term members vs members in a trial period, login device (where the system selects users based on their active device type (e.g., smart tv, Android device, Apple device, etc.)), or devices supporting only certain feature sets, etc.

Once the experiment scope is determined, experimenters may specify which modifications (e.g., which updated data structures 417) they would like to test within the page generation framework. Generally, these changes can either be made by modifying the configuration of the existing system or by implementing new code and then deploying the new code to the simulation system. There are several ways to control which code is run in the simulation system 600, including but not limited to: 1) A/B test allocations, where the system collects metrics of the behavior of an A/B test that is not yet allocated, analyzes the behavior across cells using custom metrics, and/or inspects the effect of allocating members to multiple A/B tests, 2) page generation models which compare performance of different UI page generation models, such that when a UI page is constructed using multiple models, the system evaluates interactions between different models, 3) device capabilities & page geometry, where geometry is the number of rows and columns for the device and may differ drastically between different devices (e.g., the number of rows or columns displayed on a mobile device may be much smaller than the number of rows and columns displayed on a smart tv).

In some cases, multiple modifications may be grouped together to define different variants. During metrics computation, the system 600 may collect each metric at the level of variant and stratification. This detailed breakdown of metrics allows for a fine-grained attribution of any shifts in page characteristics.

Thus, once the experiment is configured, the experimenter 601 submits the experiment for execution. The execution workflow for the experiment may proceed using some or all of the following stages: partitioning the experiment into smaller chunks, computing pages asynchronously for each partition, and computing experiment metrics. Even though experiments may be configured as a single entity by experiment owners, the coordinator 603 of system 600 may break the execution of an experiment down into multiple independent tasks. The coordinator may break down the experiment in order to handle certain system limitations and/or different latency profiles. For example, in some cases, retrieving profile-specific data from a time-travel database might need some warm-up time for a subset of dates. Some modifications to the UI page algorithm might impact the latency of page generation more significantly than other changes. When time traveling to different times in the past, different computing clusters hosting page generation services may be needed for each selected snapshot time. As such, the coordinator 603 (which may be the same as or different than controller 401 of FIG. 4) may break the experiment into different partitions.

Once the partitions are defined, for each partition, the system may send out an event to a Request Poster 605 via a message queue (e.g., a simple queue service (SQS) 604A. The Request Poster may be responsible for reading data and applying stratification to select profiles for each partition. For each selected profile, the system then generates page computation requests that are written to a dedicated queue per partition (e.g., queue 604B). Each queue may then be drained by a (potentially) separate cluster hosting a Page Generator service 606 that is launched to serve a particular partition. These clusters may be application container stacks that are each programmatically configured using custom bootstrapping code that is executed before the service is fully initialized. This setup enables the system 600 to create different server environments, for example to initialize the containers with different ML model feed versions and other data to precisely replicate time traveled state in the past. Once the UI Page Generator 606 is running, it processes the requests in the queue 604B to compute the simulated pages 607 under the definition of the requested variant. Generated UI pages 607 may then be persisted to a database table for metrics processing.

Thus, at least some embodiments implement queue-based communication between the systems to decouple the systems and allow for easy retries of each request, as well as individual partitions. Writing the generated pages to a data store (e.g., 421 of FIG. 4) and separating the Metrics Computation stage (e.g., 608-610) allows the system 600 to change the metrics without the need of regenerating all pages and provides the system with the ability to compute new metrics on previously generated pages that might have been very expensive to compute.

As mentioned previously, the system 600 may create application container stacks to define a miniature multimedia content streaming ecosystem on-the-fly for each simulation. Because there may be multiple services involved in UI page construction and because the system 600 may be designed to time travel all of them together to replicate a specific point in time in the past, the application stacks of multiple services may be started with a common time configuration. Moreover, traffic may be routed between the application stacks on the fly in each experiment. This common time configuration and traffic routing may be provided by the coordinator 603 and/or the status keeper 602. These components may provide the precision needed to be able to simulate and correlate metrics correctly with actions of users that happened in the past. This coordination also allows the system 600 to test how changes in those systems end up impacting the final UI page output.

Achieving high temporal accuracy across multiple systems and data sources may be computationally and organizationally demanding. To ensure such temporal accuracy, the system 600 may include one or more tools that compare actual UI pages generated by the live (production) system with UI pages generated by the simulator (e.g., page generator 606), both in terms of the final UI output but also the features involved in the ML models. To ensure that temporal accuracy is maintained going forward, the system may implement automated checks to avoid regressions in future changes and also to determine whether new data sources have come online that should be included in the UI page generation. As such, the system 600 may be architected in a very flexible way so that, in the future, users can define more downstream systems that should be initialized and to which traffic should be routed.

Once the generated UI pages 607 are saved to a data store, the coordinator 603 may send a signal to a workflow manager (e.g., a page experimentation service) to complete UI page generation. This may trigger a service or a metrics processor (e.g., 608) to calculate one or more metrics, normalize the results (e.g., 609), and save both the raw and normalized data to a reporting dashboard (e.g., 610). From there, experimenters can access the results of their simulation either using preconfigured reports or access their results from notebooks that pull the raw data from the data store. Or, further, the experimenters may access the raw UI pages to compute experiment-specific metrics.

Given the asynchronous nature of the experiment workflow and the need to govern the life-cycle of multiple services potentially running on multiple clusters dedicated for each partition, the coordinator 603 (or, perhaps, 401 of FIG. 4) may be configured to manage the experiment workflow. Thus, a workflow management system may be implemented with one or more of the following capabilities: automatic retry of single or multiple workflow steps in case of a transient failure, conditional execution of workflow steps, specific workflow execution rules, or maintaining execution history records. The workflow engine may be implemented to execute tasks including: governing the life-cycle of page generation services dedicated for each partition (e.g., external startup, shutdown tasks), initializing metrics computation when page generation for all partitions is complete, terminating the simulation when the simulation does not have a sufficient page yield (high error rate), sending out notifications to simulation owners on the status of the simulation, and listening to the heartbeat of each component in the simulation system and terminate the simulation when an issue is detected.

To facilitate life-cycle management and to monitor the overall health of a simulation or experiment, the system may implement a separate micro-service referred to as a Status Keeper 602. This service may provide any one or more of the following capabilities: giving a detailed report with granular metrics about different steps (e.g., Coordinator/Request Poster/Page Generator and Metric Analyzer) in the system to let the experimenter make the decision on whether or not they can rely on the results, aiding in lifecycle decisions to fast fail the experiment if failure threshold has been reached, and storing and retrieving status and aggregating counter information.

Once the experimenter kicks off the experiment, each application in the simulation system 600 may report its status to the Status Keeper service 602. This status may include several values such as App running, App completed, Step failed, etc. These indicators allow the experimenter to know about the status of their experiment as well as allow the life-cycle manager to know the next step to take in managing the simulation system. To create a complete status report, all the status and counter data recorded by each application may be combined in the system to get a view of the overall health of the system.

One part of improving UI page generation models may include having accurate and reliable offline metrics to track model performance and to compare different model variants. In some cases, there may not be a perfect correspondence between offline results and results from A/B testing. For example, if model variants M1 and M2 are built such that M1 is better than M2 in terms of the offline metric m by x %. The online A/B test performance may be measured by a different metric c and it may turn out that M1 is better than M2 by a margin significantly different from x or indeed that M2 is actually the better variant. Given A/B tests' need to run for a relatively lengthy amount of time to measure long-term metrics, generating an offline metric that provides an accurate pulse of how the testing might be completed may be very beneficial. As such, the UI page simulation system 600 may implement offline metrics that lead to an improved correspondence to online A/B metrics.

One source of discrepancy between online and offline results may be presentation bias. The real UI pages presented to members in the production system are the result of ranking media items and rows from current production UI page generation models. The engagement data (what members click, watch, touch, or otherwise interact with) that results from the UI changes is thus strongly influenced by those models. For example, members may only be able to see and engage with media items from rows that the production system served to them in the UI. Thus, one characteristic provided by the offline metrics is to mitigate this bias so that the system doesn't unduly favor or disfavor the production model.

In the absence of A/B testing results on new candidate models, the system may lack a basic ground truth with which to compare offline metrics. However, because of the above-described system for page simulation and time travel, the embodiments described herein may simulate how a member's page might have looked at time t when if instead of the production model P, the UI page presented to them was generated by the new model M. Indeed because of time travel, the system could also build model M based on the data available at time t so as to arrive as close as possible to the unobserved counterfactual UI page that model M would have shown. Then, to validate the effectiveness of the offline metrics, various numerical metrics may be implemented. The system 600 may use past A/B tests to ascertain how well the offline metrics computed on the simulated UI pages correlated with the actual online metrics for those A/B tests. That is, the system may be configured to take the hypothetical UI pages generated by certain models, evaluate those UI pages according to an offline metric, and then see how well those offline metrics correspond to online metrics. The system may thus be able to implement a suite of metrics that has a strong correlation with corresponding online metrics generated across multiple past A/B tests.

Having such offline metrics that strongly correlate with online metrics allows the system 600 to experiment more rapidly and reject model variants which may not be significantly better than the current production model, thus saving valuable A/B testing bandwidth. These offline metrics may also be used to detect bugs early in the model development process when the offline metrics go vigorously against a current testing hypothesis. This may save many developer cycles and experimentation cycles, and may allow experimenters to run more simulations.

In addition to tracking online results, these offline metrics may enable the system to perform other tasks including: comparing models trained with different objective functions, comparing models trained on different datasets, comparing UI page construction-related changes outside of the machine learning model, and reconciling changes in a hybrid model that may contain reasonably non-interacting changes arising out of many A/B tests running simultaneously.

Figure 7:
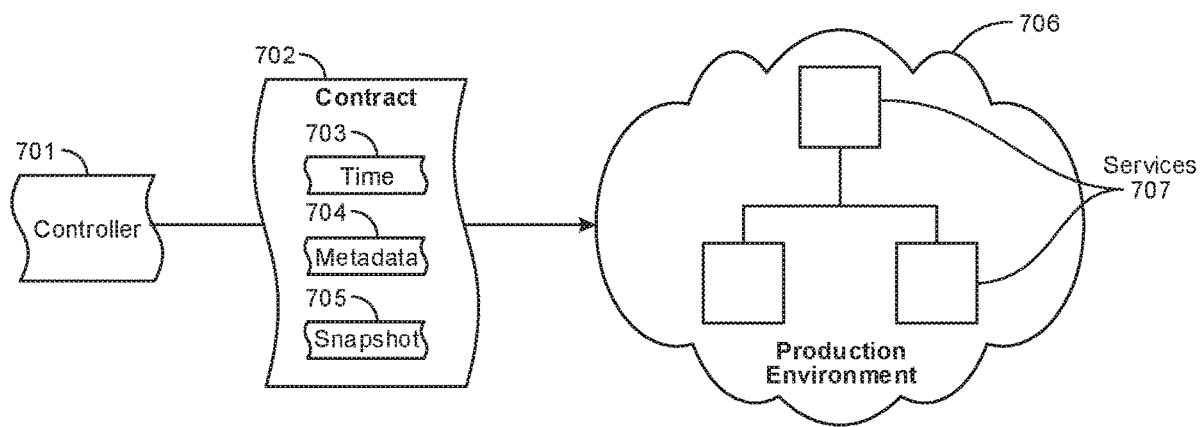
FIG. 7 illustrates a computing environment in which a contract is implemented to coordinate communications and data transfers between services.

Turning now to FIG. 7, an embodiment is illustrated in which a controller 701 (which may be the same as or different than controller 401 of FIG. 4 or coordinator 603 of FIG. 6) implements a contract 702 when using services 707 in production environment 706. As noted above, the controller 701 may be implemented to coordinate the disparate services used to provide data for generating a user interface. The controller may be configured to access live data from the production environment 706 or may access snapshotted data that starts at a specified point in time that occurred in the past. In some embodiments, the controller 701 may establish a contract 702 between any or all of the services 707 used to provide UI data. The contract 702 may specify, a common clock time 703 that each of the services is to use. Because the services are contracted to use the common clock time 703, each service will provide live or snapshotted data using the same notion of time. This increases accuracy and continuity when running simulations. Using the common clock time 703, the experimenter may provide a specified starting and specified stopping time, so that data will be provided for the intervening timeframe. The services 707 may then replay the actual incoming requests received over the specified timeframe, using the time of request back when it occurred (not necessarily the current time).

The contract 702 between the controller 701 and the services 707 may also be used to ensure that the services use the same version of metadata 704 when providing data for the UI simulations. Still further, the contract 702 may ensure that the services 707 access the same live or snapshot data 705. As such, when the controller 701 is coordinating generation of simulated UI page, the contract 702 established between the controller and the services 707 may ensure that the same notion of time 703 is used between the services, the same metadata 704 is used, and the same live or snapshot data 705 is used. This coordination between services allows the simulation system to provide consistent and reliable testing results, even across many disparate services or data sources.

In some cases, the snapshot data 705 may not only include the resulting UI pages that were served to users during the timespan, but may also include user inputs received at the services. Thus, the snapshot data 705 may track each input and each request received at the various services, and may track each output generated by the services. This provides a comprehensive view of the state of the services at the time the production UI pages were generated and served to users. The services may be stateful services running in the production environment, maintaining state data, metadata, or other information that provides insights as to why a given UI was generated the way it was. Then, when updated data structures are provided for testing (e.g., software code, configuration files, machine learning models, etc.), those updated data structures are tested using the same inputs, the same outputs, and the same general state that existed in each of the services when those services originally created the production UI pages.

Figure 8:
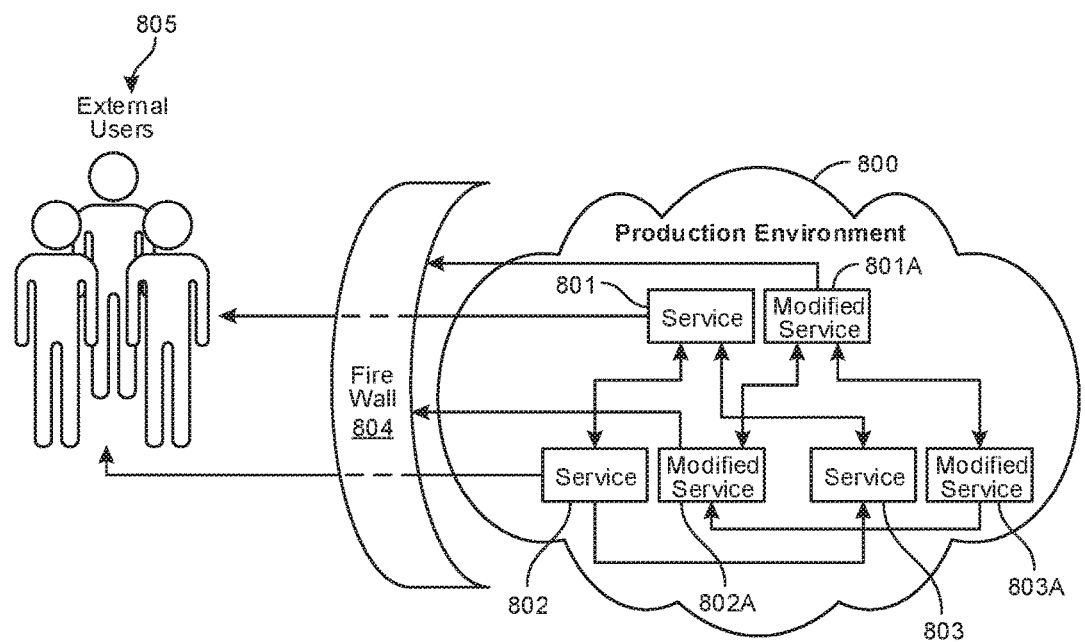
FIG. 8 illustrates a computing environment in which production services are permitted to communicate outside of a production environment, while modified services are prevented from such communication.

FIG. 8 illustrates an embodiment in which a controller modifies the at least some of the services 801-803 in production environment 800. The modifications may be very slight, or may be more substantial. In some cases, the modifications may change the services 801-803 such that calls for data between services are routed to the modified versions of the services 801A-803A. Thus, within the production environment 800, modified services 801A-803A may be instantiated alongside the production services 801-803. The production services 801-803 may be "online" or live services working with live, user-facing data, while the modified services 801A-803A may be running on the same production servers, but may be modified so that when the services call other services for data during a UI generation process, the calls go to the modified versions of the services. Moreover, the modified services 801A-803A may be changed such that their data calls and output data are not seen by external users 805. Thus, for example, within the same production environment 800, production services 801-803 may be permitted to make calls and provide output data (e.g., UI pages or UI components) that are seen by external users 805, while modified services 801A-803A may be permitted only to make calls to other modified services and may be prevented (e.g., by firewall 804 or by some other mechanism) from providing their results to external users 805.

Using this implementation, modified services 801A-803A may run in a normal production environment that is generating and serving live UI pages, while at the same time running modified services 801A-803A that are used to simulate UI pages using the updated data structures. In some cases, the modified versions of the services 801A-803A may be configured to process a batch of tasks. The batch may include substantially any number of tasks including providing data for UI pages, determining which UI components to surface and in which order, generating UI pages, and other tasks. In some cases, these modified services may be instantiated for the specific purpose of processing the batch of tasks. Then, after the batch has been processed, the modified services 801A-803A may be automatically shut down so that computing resources may be returned to the computing clusters of the production environment 800. In some cases, the modified services 801A-803A that are instantiated to process the batch of tasks may be assigned a specified data snapshot to use when processing the batch of tasks. This snapshot data is then used when performing each of the tasks in the batch of tasks. While the batch is being processed, the controller may switch from processing a batch of tasks using live data to a batch of tasks using snapshotted data or vice versa. This switch between batches may occur at the direction of the experimenter (e.g., upon receiving an indication to make a switch from the experimenter), or may occur automatically when running multiple simulations at the same time.

Regardless of which type of data is used when generating simulated UI pages, systems may be put in place to track the effectiveness of the new code. For instance, as indicated in FIG. 6, a metrics processor 608 may generate one or more metrics to establish a quality level of simulated behavior. This simulated behavior may be indicated by the outcome-defining effects 414 of FIG. 4. The metrics may indicate, for example, that an increased number of users selected a media item that was presented in a "Recommended for You" section, or may indicate that the user found a tv show or movie to watch within the first or second row of displayed shows. Conversely, the metrics may indicate that a UI change would have resulted in fewer successful media item selections or that users had to move down rows or columns further than anticipated. Thus, the outcome-determining effect of the test may indicate that the change was not effective in its intended purposes, or that the test had unintended consequences, or that the test was effective as designed. The metrics may thus provide a real-time indication of whether the test is going well or is providing negative results.

In some embodiments, computing the metrics may include altering user interface objects shown in the user interface to remove bias in the outcome-defining effects. For example, to be able to say that updated code A is better than existing code B, various UI objects may be changed, added, or removed. This removal of objects or otherwise changing what is shown on the UI may reduce bias to better indicate whether the new code is more likely to show desired media items (e.g., movies actually watched by users). In some cases, the metrics processor 608 may be configured to give at least partial credit for similarities in outcome-defining effects identified in the comparison between user interface instances. For example, if the comparing module 411 of FIG. 4 identifies one matching UI element, two partially matching elements, and three UI elements that do not match between UI instances, the metrics processor 608 may be configured to give partial credit to UI elements that match between UI instances. By giving partial credit to elements that partially match (e.g., a sequel of a first movie), the metrics processor 608 may help reduce variance which may lead to more reliable data.

In some cases, as noted above, when the comparing module 411 compares two or more UI instances to each other, the comparing may include comparing the user interface instances to previous A/B test results. For instance, previous A/B test results may show outcomes for new code A tested against existing code B. These test results may indicate that the test was generally successful or generally unsuccessful (among other test results). In cases where the new code to be tested is similar or where the intended outcome of the new code is similar to previously A/B tested code, the comparing module 411 may compare the simulated UI instances (e.g., 409 and 410) to the outputs of the previous A/B test. In some cases, the comparison to the previous A/B tests may indicate that the new code to be tested is sufficiently similar to the previously tested code and that a new A/B test does not need to be run. Conversely, the comparison to the previous A/B tests may indicate that the new code to be tested is not sufficiently similar to the previously tested code and that a new A/B test does need to be run.

In some cases, the user interface instances may be generated using snapshotted data. The snapshotted data may include user inputs over a specified period of time relative to a version of the user interface that was presented to the user at the time the snapshot was taken. By using this snapshotted data in the simulation test, the experimenter can gain an idea of what the past user would have input had the user been exposed to the new, updated UI code. When comparing user interface instance to each other to identify differences between them, the comparing may include analyzing the one user interface instance generated using the updated data structures to another user interface instance generated using the snapshotted data with the included user inputs over the specified period of time. As such, the comparison may indicate how the first user interface instance with the updated data structures compares to the second user interface instance using the same snapshotted user inputs. Accordingly, the simulations may compare how the user would react to and use the new UI with the updated code to what the user actually did using the same inputs on the older code. In this manner, an experimenter may ascertain whether their updated code is beneficial to the UI or not.

In some embodiments, a system may be provided for simulating UI pages in a production environment. The system may include at least one physical processor, and physical memory comprising computer-executable instructions that, when executed by the physical processor, cause the physical processor to: access, by a controller, various updated data structures that are to be included in a user interface functionality test, where the updated data structures contribute at least partially to a user interface. The physical processor further accesses, by the controller, a portion of live or snapshotted data captured from various services running in a production environment. The live or snapshotted data may be used in the user interface functionality test.

The physical processor may further, initiate, by the controller, generation of a first user interface instance using the updated data structures and using the accessed live or snapshotted data, and may initiate, by the controller, generation of a second user interface instance using a different version of the data structures and using the same accessed live or snapshotted data. The first and second user interface instances may be generated within the production environment but may be inaccessible to external users. The physical processor may also, compare, by the controller, the first user interface instance to the second user interface instance to identify differences between the first user interface instance and the second user interface instance, and based on the comparison, determine, by the controller, outcome-defining effects the updated data structures had on the user interface based on the identified differences between the first user interface instance and the second user interface instance.

A corresponding non-transitory computer-readable medium comprising one or more computer-executable instructions that, when executed by at least one processor of a computing device, cause the computing device to access, by a controller, updated data structures that are to be included in a user interface functionality test, where the updated data structures contribute at least partially to a user interface. The instructions also cause the processor to access, by the controller, a portion of live or snapshotted data captured from services running in a production environment, wherein the live or snapshotted data is used in the user interface functionality test.

The instructions also cause the processor to initiate, by the controller, generation of a first user interface instance using the updated data structures and using the accessed live or snapshotted data and to initiate, by the controller, generation of a second user interface instance using a different version of the data structures and using the same accessed live or snapshotted data, where the first and second user interface instances are generated within the production environment but are inaccessible to external users. The instructions further cause the processor to compare, by the controller, the first user interface instance to the second user interface instance to identify one or more differences between the first user interface instance and the second user interface instance, and based on the comparison, determine, by the controller, outcome-defining effects the updated data structures had on the user interface based on the identified differences between the first user interface instance and the second user interface instance.

Accordingly, in this manner, the embodiments described herein may be configured to simulate and test user interface pages within a production environment without allowing users outside of the production environment to see the tests. Experimenters may avoid the lengthy time- and resource-consuming process of running user-facing A/B tests, and may simply run simulated tests to determine, using snapshotted data, how a user would have responded to a user interface had it included the updated features. The simulated test may be run much more quickly and may be more accurate due to the use of actual user and state data stored in the snapshots.

1. A computer-implemented method comprising: accessing, by a controller, one or more updated data structures that are to be included in a user interface functionality test, the updated data structures contributing at least partially to a user interface; accessing, by the controller, a portion of live or snapshotted data captured from one or more services running in a production environment, the live or snapshotted data being used in the user interface functionality test; initiating, by the controller, generation of a first user interface instance using the updated data structures and using the accessed live or snapshotted data; initiating, by the controller, generation of a second user interface instance using a different version of the data structures and using the same accessed live or snapshotted data, wherein the first and second user interface instances are generated within the production environment but are inaccessible to external users; comparing, by the controller, the first user interface instance to the second user interface instance to identify one or more differences between the first user interface instance and the second user interface instance; and based on the comparison, determining, by the controller, one or more outcome-defining effects the updated data structures had on the user interface based on the identified differences between the first user interface instance and the second user interface instance.

2. The computer-implemented method of claim 1, wherein the controller further coordinates the one or more services to access the live or snapshotted data starting at a specified point in time.

3. The computer-implemented method of claim 2, wherein the controller further coordinates the one or more services to access a common clock based on the specified point in time.

4. The computer-implemented method of claim 2, wherein the controller establishes a contract between the one or more services to ensure that the services use the same version of metadata and to ensure that the services access the same live or snapshotted data.

5. The computer-implemented method of claim 1, wherein the snapshotted data includes inputs received at the one or more services in addition to outputs generated by the one or more services.

6. The computer-implemented method of claim 1, wherein the one or more services comprise stateful services running in the production environment, at least a portion of state information being stored for each service.

7. The computer-implemented method of claim 1, wherein the one or more updated data structures comprise at least one of software code, configuration files, or machine learning models.

8. The computer-implemented method of claim 1, wherein the controller modifies the one or more services, such that calls for data between services are routed to the modified versions of the services.

9. The computer-implemented method of claim 8, wherein the one or more modified versions of the services are instantiated to process a batch of tasks and are automatically shut down upon completion of the batch of tasks.

10. The computer-implemented method of claim 9, wherein the modified versions of the services are instantiated to process the batch of tasks are assigned a specified data snapshot to use when processing the batch of tasks.

11. The computer-implemented method of claim 1, wherein the controller switches from live data to snapshotted data or switches from snapshotted data to live data upon receiving an indication to make a switch.

12. A system comprising: at least one physical processor; physical memory comprising computer-executable instructions that, when executed by the physical processor, cause the physical processor to: access, by a controller, one or more updated data structures that are to be included in a user interface functionality test, the updated data structures contributing at least partially to a user interface; access, by the controller, a portion of live or snapshotted data captured from one or more services running in a production environment, the live or snapshotted data being used in the user interface functionality test; initiate, by the controller, generation of a first user interface instance using the updated data structures and using the accessed live or snapshotted data; initiate, by the controller, generation of a second user interface instance using a different version of the data structures and using the same accessed live or snapshotted data, wherein the first and second user interface instances are generated within the production environment but are inaccessible to external users; compare, by the controller, the first user interface instance to the second user interface instance to identify one or more differences between the first user interface instance and the second user interface instance; and based on the comparison, determine, by the controller, one or more outcome-defining effects the updated data structures had on the user interface based on the identified differences between the first user interface instance and the second user interface instance.

13. The system of claim 12, further comprising computing one or more metrics to establish a quality level of simulated behavior indicated by the outcome-defining effects.

14. The system of claim 13, wherein computing the one or more metrics includes altering one or more user interface objects shown in the user interface to remove bias in the one or more outcome-defining effects.

15. The system of claim 13, wherein the metrics give at least partial credit for similarities in outcome-defining effects identified in the comparison between the first user interface instance and the second user interface instance.

16. The system of claim 12, wherein comparing the first user interface instance to the second user interface instance comprises comparing at least one of the first user interface instance or the second user interface instance to previous A/B test results.

17. The system of claim 16, wherein the comparison to the previous A/B tests indicates whether a new A/B test is to be run.

18. The system of claim 12, wherein the second user interface instance is generated using snapshotted data that indicates user inputs over a specified period of time relative to a version of the user interface that was presented to the user at the time the snapshot was taken.

19. The system of claim 18, wherein comparing the first user interface instance to the second user interface instance to identify one or more differences between the first user interface instance and the second user interface instance includes comparing the first user interface instance generated using the updated data structures to the second user interface instance generated using the snapshotted data with the indicated user inputs over the specified period of time, such that the comparison indicates how the first user interface instance with the one or more updated data structures compares to the second user interface instance using the same snapshotted user inputs.

20. A non-transitory computer-readable medium comprising one or more computer-executable instructions that, when executed by at least one processor of a computing device, cause the computing device to: access, by a controller, one or more updated data structures that are to be included in a user interface functionality test, the updated data structures contributing at least partially to a user interface; access, by the controller, a portion of live or snapshotted data captured from one or more services running in a production environment, the live or snapshotted data being used in the user interface functionality test; initiate, by the controller, generation of a first user interface instance using the updated data structures and using the accessed live or snapshotted data; initiate, by the controller, generation of a second user interface instance using a different version of the data structures and using the same accessed live or snapshotted data, wherein the first and second user interface instances are generated within the production environment but are inaccessible to external users; compare, by the controller, the first user interface instance to the second user interface instance to identify one or more differences between the first user interface instance and the second user interface instance; and based on the comparison, determine, by the controller, one or more outcome-defining effects the updated data structures had on the user interface based on the identified differences between the first user interface instance and the second user interface instance.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to initialize a test, use the result of the transformation to perform the test, and store the result of the transformation as test results. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    accessing, by a controller, one or more updated data structures that are to be included in a user interface functionality test, the updated data structures contributing at least partially to a user interface;
    accessing, by the controller, a portion of live or snapshotted data captured from one or more services running in a production environment, the services being initialized at a specified common time identified in a shared contract that is shared among the services, the shared contract providing a common notion of time among the services, wherein the live or snapshotted data is used in the user interface functionality test, and wherein the live or snapshotted data includes service data generated by the services and user input data identifying user inputs received at the user interface, wherein the services implement queue-based communication that decouples the services and provides individual request retries;
    initiating, by the controller, generation of a first simulated user interface instance using the updated data structures and using the accessed live or snapshotted data, the first simulated user interface portraying how the updated data structures would function if exposed to external users when hosted by the production environment;
    initiating, by the controller, generation of a second simulated user interface instance using a different version of the updated data structures and using the accessed live or snapshotted data, the second simulated user interface portraying how the different version of the updated data structures would function if exposed to external users when hosted by the production environment, wherein the first and second simulated user interface instances are generated within the production environment but are inaccessible to external users;
    computing one or more metrics related to the first and second user interface instances, wherein the computation is performed in a separate computing stage, the separate computing stage allowing the metrics to be changed during computation without regenerating at least a portion of the first and second user interface instances;
    comparing, by the controller, the first user interface instance to the second user interface instance to identify one or more differences between the first user interface instance and the second user interface instance according to the live or snapshotted data and according to the user input data identifying user inputs received at the user interface; and
    based on the comparison, determining, by the controller, one or more outcome-defining effects the updated data structures had on the user interface based on the identified differences between the first user interface instance and the second user interface instance.

2. The computer-implemented method of claim 1, wherein the controller further coordinates the one or more services to access the live or snapshotted data starting at a specified point in time.

3. The computer-implemented method of claim 2, wherein the controller further coordinates the one or more services to access a common clock based on the specified point in time.

4. The computer-implemented method of claim 2, wherein the controller establishes a contract between the one or more services to ensure that the one or more services use a same version of metadata and to ensure that the services access a same live or snapshotted data.

5. The computer-implemented method of claim 1, wherein the snapshotted data includes inputs received at the one or more services in addition to outputs generated by the one or more services.

6. The computer-implemented method of claim 1, wherein the one or more services comprise stateful services running in the production environment, at least a portion of state information being stored for each service.

7. The computer-implemented method of claim 1, wherein the one or more updated data structures comprise at least one of software code, configuration files, or machine learning models.

8. The computer-implemented method of claim 1, wherein the controller modifies the one or more services to generate one or more modified versions of the services, such that calls for data between the services are routed to the modified versions of the services.

9. The computer-implemented method of claim 8, wherein the one or more modified versions of the services are instantiated to process a batch of tasks and are automatically shut down upon completion of the batch of tasks.

10. The computer-implemented method of claim 9, wherein the modified versions of the services are instantiated to process the batch of tasks are assigned a specified data snapshot to use when processing the batch of tasks.

11. The computer-implemented method of claim 1, wherein the controller switches from live data to snapshotted data or switches from snapshotted data to live data upon receiving an indication to make a switch.

12. A system comprising:
    at least one physical processor;
    physical memory comprising computer-executable instructions that, when executed by the physical processor, cause the physical processor to:
        access, by a controller, one or more updated data structures that are to be included in a user interface functionality test, the updated data structures contributing at least partially to a user interface;
        access, by the controller, a portion of live or snapshotted data captured from one or more services running in a production environment, the services being initialized at a specified common time identified in a shared contract that is shared among the services, the shared contract providing a common notion of time among the services, wherein the live or snapshotted data is used in the user interface functionality test, and wherein the live or snapshotted data includes service data generated by the services and user input data identifying user inputs received at the user interface, wherein the services implement queue-based communication that decouples the services and provides individual request retries;

initiate, by the controller, generation of a first simulated user interface instance using the updated data structures and using the accessed live or snapshotted data, the first simulated user interface portraying how the updated data structures would function if exposed to external users when hosted by the production environment;

initiate, by the controller, generation of a second simulated user interface instance using a different version of the updated data structures and using the accessed live or snapshotted data, the second simulated user interface portraying how the different version of the updated data structures would function if exposed to external users when hosted by the production environment, wherein the first and second simulated user interface instances are generated within the production environment but are inaccessible to external users;

computing one or more metrics related to the first and second user interface instances, wherein the computation is performed in a separate computing stage, the separate computing stage allowing the metrics to be changed during computation without regenerating at least a portion of the first and second user interface instances;

compare, by the controller, the first user interface instance to the second user interface instance to identify one or more differences between the first user interface instance and the second user interface instance according to the live or snapshotted data and according to the user input data identifying user inputs received at the user interface; and based on the comparison, determine, by the controller, one or more outcome-defining effects the updated data structures had on the user interface based on the identified differences between the first user interface instance and the second user interface instance.

13. The system of claim 12, further comprising computing one or more metrics to establish a quality level of simulated behavior indicated by the outcome-defining effects.

14. The system of claim 13, wherein computing the one or more metrics includes altering one or more user interface objects shown in the user interface to remove bias in the one or more outcome-defining effects.

15. The system of claim 13, wherein the metrics give at least partial credit for similarities in outcome-defining effects identified in the comparison between the first user interface instance and the second user interface instance.

16. The system of claim 12, wherein comparing the first user interface instance to the second user interface instance comprises comparing at least one of the first user interface instance or the second user interface instance to previous A/B test results.

17. The system of claim 16, wherein the comparison to the previous A/B test results indicate whether a new A/B test is to be run.

18. The system of claim 12, wherein the second user interface instance is generated using snapshotted data that indicates user inputs over a specified period of time relative to a version of the user interface that was presented to a user at the time a snapshot was taken.

19. The system of claim 18, wherein comparing the first user interface instance to the second user interface instance to identify one or more differences between the first user interface instance and the second user interface instance includes comparing the first user interface instance generated using the updated data structures to the second user interface instance generated using the snapshotted data with the indicated user inputs over the specified period of time, such that the comparison of the first user interface instance generated using the updated data structures to the second user interface instance generated using the snapshotted data with the indicated user inputs over the specified time period indicates how the first user interface instance with the one or more updated data structures compares to the second user interface instance using the same snapshotted user inputs.

20. A non-transitory computer-readable medium comprising one or more computer-executable instructions that, when executed by at least one processor of a computing device, cause the computing device to:

access, by a controller, one or more updated data structures that are to be included in a user interface functionality test, the updated data structures contributing at least partially to a user interface;

access, by the controller, a portion of live or snapshotted data captured from one or more services running in a production environment, the services being initialized at a specified common time identified in a shared contract that is shared among the services, the shared contract providing a common notion of time among the services, wherein the live or snapshotted data is used in the user interface functionality test, and wherein the live or snapshotted data includes service data generated by the services and user input data identifying user inputs received at the user interface, wherein the services implement queue-based communication that decouples the services and provides individual request retries;

initiate, by the controller, generation of a first simulated user interface instance using the updated data structures and using the accessed bye or snapshotted data, the first simulated user interface portraying how the updated data structures would function if exposed to external users when hosted by the production environment;

initiate, by the controller, generation of a second simulated user interface instance using a different version of the updated data structures and using the accessed live or snapshotted data, the second simulated user interface portraying how the different version of the updated data structures would function if exposed to external users when hosted by the production environment, wherein the first and second simulated user interface instances are generated within the production environment but are inaccessible to external users;

compute one or more metrics related to the first and second user interface instances, wherein the computation is performed in a separate computing stage, the separate computing stage allowing the metrics to be changed during computation without regenerating at least a portion of the first and second user interface instances;

compare, by the controller, the first user interface instance to the second user interface instance to identify one or more differences between the first user interface instance and the second user interface instance according to the live or snapshotted data and according to the user input data identifying user inputs received at the user interface; and based on the comparison, determine, by the controller, one or more outcome-defining, effects the updated data structures bad on the user interface based on the identified differences between the first user interface instance and the second user interface instance.

* * * * *

UNITED STATES PATENT AND TRADEMARK OFFICE
CERTIFICATE OF CORRECTION

PATENT NO. : 11,409,637 B2
APPLICATION NO. : 16/746795
DATED : August 9, 2022
INVENTOR(S) : David Gevorkyan et al.

Page 1 of 1

It is certified that error appears in the above-identified patent and that said Letters Patent is hereby corrected as shown below:

In the Claims

In Column 30, Line 45, in Claim 20, delete "bye" and insert -- live --.

Signed and Sealed this
Eleventh Day of October, 2022

Katherine Kelly Vidal
*Director of the United States Patent and Trademark Office*